United States Patent

Forschirm et al.

[11] Patent Number: 5,822,868
[45] Date of Patent: Oct. 20, 1998

[54] LUMINOUS FLAME OF ACETAL POLYMERS

[75] Inventors: Alex Forschirm, Parsippany; James Howard, Somerset, both of N.J.

[73] Assignee: HNA Holdings, Inc., Warren, N.J.

[21] Appl. No.: 709,081

[22] Filed: Sep. 6, 1996

Related U.S. Application Data

[60] Provisional application No. 60/003,657, Sep. 12, 1995.

[51] Int. Cl.[6] .................. B25G 1/10; C08K 5/09
[52] U.S. Cl. .............. 30/340; 30/345; 524/394; 524/593; 524/612
[58] Field of Search ................... 524/394, 593, 524/612; 30/34, 345; 428/131

[56] References Cited

U.S. PATENT DOCUMENTS

| | | | |
|---|---|---|---|
| 4,225,703 | 9/1980 | Amann et al. | 524/593 X |
| 4,342,680 | 8/1982 | Sugio et al. | 524/593 X |
| 5,212,222 | 5/1993 | Mitsuuchi et al. | 524/593 X |
| 5,218,041 | 6/1993 | Arnoldi et al. | 524/593 |
| 5,478,877 | 12/1995 | Komatsu et al. | 524/593 X |
| 5,502,093 | 3/1996 | Katsumata et al. | 524/593 X |

*Primary Examiner*—Fred Teskin
*Attorney, Agent, or Firm*—James M. Hunter, Jr.

[57] ABSTRACT

Polyacetal compositions containing a minor amount of sodium acetate sufficient to exhibit a luminous flame when exposed to combustible conditions.

8 Claims, No Drawings

LUMINOUS FLAME OF ACETAL POLYMERS

RELATED APPLICATION

This application claims the benefit of U.S. Provisional application Ser. No. 60/003,657 filed on Sep. 12, 1995.

1. Field of the Invention

The present invention relates to the acetal (i.e., polyoxymethylene) polymers which, among other advantageous properties, exhibit a luminous flame under combustion conditions.

2. Background of the Invention

The use of acetal polymers has expanded rapidly in the last several years due to their desirable chemical and physical properties, and relatively low costs. One important use of these polymers has been the replacement of metallic materials in electronic, mechanical and structural applications. However, these polymers typically burn with a bluish, nearly-invisible flame. Such non-flammable properties could be hazardous in certain environments, particularly, if one were to unknowingly touch a burning component prepared from the polymer due to the absence of a noticeable flame.

SUMMARY OF THE INVENTION

The present invention is directed to a polyacetal composition of the general formula:

containing a minor amount of sodium acetate, wherein the composition exhibits luminous flaming properties. The composition is useful for the preparation of shaped articles, e.g., handles for kitchen and cutlery utensils, etc. wherein the articles may be utilized in potentially flammable environments.

DETAILED DESCRIPTION OF THE INVENTION

Generally, the invention is directed to a novel polymeric composition containing a major amount of a polyacetal and a minor amount of sodium acetate, wherein the composition exhibits a "bluish-yellow" luminous flame when burning under atmospheric conditions. Typically, the present invention may contain from about 99.0 to about 99.9 weight percent of polyacetal and from about 1.0 to about 0.1 weight percent of sodium acetate. Preferably, the invention may contain about 99.5 weight percent of polyacetal and about 0.5 weight percent of sodium acetate. In addition, other additives such as anti-oxidants, acid scavengers, lubricants and the like may be added to the formulation with a concomitant reduction in the polyoxymethylene copolymer flake.

Polyoxymethylene, i.e., polyacetal or oxymethylene polymers useful in the present invention are generally characterized as having recurring oxymethylene units of the general formula:

Polyoxymethylenes that are useful in making composition of the invention generally have a fairly high content of oxymethylene units, i.e., generally greater that about 85 percent. These materials are commercially available from a number of manufacturers as homopolymers, copolymers, terpolymers, and the like. These highly crystalline acetals, described briefly hereinbelow, are well known in the art and have been reviewed extensively. For example, a review of polymeric acetals entitled, "Acetal Resins," by T. J. Dolce and J. A. Grates, may be found in the Second Edition of *Encyclopedia of Polymer Science and Engineering,* John Wiley and Sons, New York, 1985, Vol. 1, pp. 42–61. Additional information on acetal polymers can be found in French Patent No. 1,221,148, as well as commonly assigned U.S. Pat. Nos. 3,027,352, 3,072,069, 3,147,234, and 3,210,318.

Typically, acetal homopolymers may be prepared by polymerizing anhydrous formaldehyde or trioxane. Oxymethylene homopolymers are typically stabilized against thermal degradation by end-capping with, for example, ester or ether groups, such as those derived from alkanoic anhydrides (e.g., acetic anhydride) or dialkyl ethers, (e.g., dimethyl ether) or by incorporating stabilizer compounds into the homopolymer. Commercially available acetal homopolymer is made by polymerizing anhydrous formaldehyde in the presence of an initiator after which the polymer is end-capped by acetylation of the hemiacetal end groups with acetic anhydride in the presence of a catalyst. Methods for making end-capped acetal homopolymers are taught in U.S. Pat. Nos. 2,786,994 and 2,998,409. Acetal homopolymers are well know in the art and are commercially available under the trademarks DELRIN® and TENAC®.

Polymeric acetals which have been found to be especially suitable for use in the composition of the present invention are crystalline oxymethylene copolymers having repeat units which consist essentially of oxymethylene groups interspersed with oxy(higher alkylene) groups of the general formula:

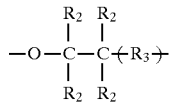

wherein each and $R_2$ is hydrogen, a lower alkyl group, or a halogen substituted lower alkyl group, each $R_3$ is a methylene, oxymethylene, lower alkyl or haloalkyl substituted methylene or lower alkyl or haloalkyl substituted oxymethylene group. Each lower alkyl group preferably contains one or two carbon atoms. Oxymethylene groups generally will constitute from about 85 to 99.9 mole percent of the recurring units in such copolymers and are generally incorporated by ring-opening polymerization of trioxane in the presence of an acidic catalyst. The oxy(higher alkylene) groups are incorporated into the polymer by copolymerizing a cyclic ether or cyclic formal having at least two adjacent carbon atoms in the ring in addition to trioxane. The cyclic ether or formal is incorporated by the breaking of an oxygen-to-carbon linkage. The preferred oxy(higher alkylene) group is oxyethylene, having the formula:

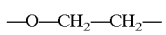

Oxyethylene may be incorporated into the polymer by copolymerization of ethylene oxide or 1,3-dioxolane with trioxane.

The preferred crystalline acetal copolymers, as described above which have a structure consisting essentially of oxymethylene and oxyethylene groups, are thermoplastic materials having a melting point of at least 150° C. They normally are millable or processible at temperatures ranging from about 175° C. to about 215° C. These copolymers are normally highly crystalline and exhibit a polymer crystallinity from about 60 percent to about 90 percent or greater.

Typically, oxymethylene copolymers are stabilized after manufacture by degradation of unstable molecular ends of the polymer chains to a point where a relatively stable carbon-to-carbon linkage prevents further degradation of each end of the polymer chain. Such degradation of unstable molecular ends is generally effected by hydrolysis, as disclosed, for example, in U.S. Pat. No. 3,219,623 to Berardinelli. Oxymethylene copolymer may also be stabilized by end-capping, again using techniques well known to those skilled in the art, as for example by acetylation with acetic anhydride in the present of a sodium acetate catalyst.

A particularly preferred class of oxymethylene copolymers is commercially available under the trade name CELCON® acetal copolymer. CELCON acetal copolymers typically are copolymers of about 98 weight percent of trioxane and about 2 percent of ethylene oxide. CELCON is a registered trademark of Hoechst Celanese Corporation. The compositions of the current invention may be made using any commercial grade of CELCON acetal, including CELCON M50™ and M25™ acetal copolymers, which have melt flow indexes of about 5.0 and 2.5 g/10 min, respectively, when tested in accordance with ASTM D1238-82, CELCON M90™ acetal copolymer, which has a lower molecular weight and melt viscosity than CELCON M25.

Oxymethylene terpolymers may also be used in making the luminous flaming compositions of the present invention. These terpolymers contain oxymethylene groups, oxy (higher alkylene) groups such as those corresponding to the general formula:

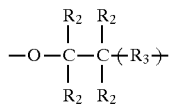

and a different third group which has been interpolymerized with the oxymethylene and oxy(higher alkylene) groups. A terpolymer as described above is typically made by reacting trioxane with a cyclic ether or cyclic acetal and a third monomer which is a bifunctional compounds, such as a diglycide of the formula:

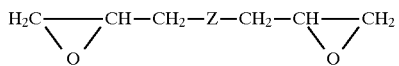

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy) group, preferably one having from 2 to 4 recurring lower alkoxy groups each with 1 or 2 carbon atoms. Examples of suitable bifunctional compounds include the diglycidyl ethers of ethylene glycol, 1,2-propanediol, and 1,4-butanediol with the diglycidyl ether of 1,4-butanediol being preferred. Generally, when preparing such terpolymers, ratios of from 99.89 to 89.0 weight percent trioxane, 0.1 to 10 weight percent of the cyclic ether or cyclic acetal, and 0.01 to 1 weight percent of the bifunctional compound are preferred, based on the total weight of monomers used in forming the terpolymer. A particularly preferred oxymethylene terpolymer is commercially available from Hoechst Celanese Corporation under the name CELCON U10-01 acetal polymer, made from 1,4-butanediol diglycidyl ether crosslinker, ethylene oxide and trioxane containing about 0.05 weight percent, 2.0 weight percent, and 97.95 weight percent, respectively, of repeating units derived from these three monomers, based on the total weight of the terpolymer. The oxymethylene-based terpolymers are made and stabilized by methods well known in the art, such as by the addition of antioxidants and formaldehyde scavengers. More detailed descriptions of the methods for making oxymethylene-based terpolymers and their compositions can be found in previously cited patents.

These oxymethylene polymers may be combined in various proportions by melt blending in extruders or similar apparatus to form suitable polymers for preparation of the luminous composition of the present invention. Generally, polyoxymethylene polymers are readily blendable with the sodium acetate, other additives and processing aids when the polymer is in the molted state, i.e., at temperatures of at least about 170° C. and atmospheric pressure. Other additives may include those compounds which do not distract from the novelty of the invention such as lubricants, colorants, ultra violet stabilizers, etc.

The following examples are general illustrations of methods for preparing the polymeric composition of the invention. They are provided for purposes of exemplification only as should be appreciated from the foregoing discussion.

EXAMPLE I

A polyacetal composition containing 0.1 weight percent of sodium acetate was prepared, as follows:

| | |
|---|---|
| a) polyoxymethylene copolymer unstabilized flake | 99.9 wt % |
| b) sodium acetate | 0.1 wt % |

The components were throughly blended by hand and compression molded at 400° F. into 2" discs. Small compression molded test disks were burned and the degree of luminosity was visually evaluated as a guide in Examples 1 through 5 hereinafter. Based on these, quantitative luminosity measurements were made on the preferred composition and control using the Flame Luminosity Test in Examples 6 and 7 hereinafter.

EXAMPLE 2

A composition containing 1.0 weight percent of sodium acetate as well as test discs were prepared according with the procedure of Example 1, as follows:

| | |
|---|---|
| a) polyoxymethylene copolymer unstabilized flake | 99.00 wt % |
| b) sodium acetate | 1.00 wt % |

EXAMPLE 3

A polyacetal composition containing 0.5 weight percent of sodium acetate as well as other additives, and test discs therefrom were prepared in accordance with the procedure of Example 1, as follows:

| | |
|---|---|
| a) polyoxymethylene copolymer unstabilized flake | 98.15 wt % |
| b) Irganox 259 ® | 0.50 wt % |
| c) polyoxymethylene terpolymer | 0.50 wt % |
| d) Acrawax C ® | 0.20 wt % |

|   |   |
|---|---|
| d) Elvamide ®/Surlyn ® concentrate | 0.15 wt % |
| e) sodium acetate | 0.50 wt % |

EXAMPLE 4

A polyacetal composition containing 0.5 weight percent of sodium acetate and other additives, as well as test discs therefrom were prepared according to the procedures of Example 1, except the Elvamide/Suryln concentrate was replaced with calcium ricinoleate, as follows:

|   |   |
|---|---|
| a) polyoxymethylene copolymer unstabilized flake | 98.50 wt % |
| b) Irganox 259 | 0.20 wt % |
| c) polyoxymethylene terpolymer | 0.50 wt % |
| d) Acrawax C | 0.20 wt % |
| d) calcium ricinoleate | 0.10 wt % |
| e) sodium acetate | 0.50 wt % |

COMPARATIVE EXAMPLE 5

To compare the luminance of polyacetal compositions containing sodium acetate, as prepared in Examples 1 through 4, with that of a polyacetal composition containing 0 wt % of sodium acetate, a comparative composition was prepared in accordance with the procedure of Example 1, as follows:

|   |   |
|---|---|
| a) polyoxymethylene copolymer unstabilized flake | 98.80 wt % |
| b) Irganox 259 | 0.50 wt % |
| c) polyoxymethylene terpolymer | 0.35 wt % |
| d) Acrawax C | 0.20 wt % |
| d) Elvamide/Surlyn ® concentrate | 0.15 wt % |

The test discs were burned in a fume hood under atmospheric conditions to visually determine the luminance of any flames emitted therefrom. Each of the discs of Examples 1 through 4 produced a visible "bluish-yellow" flame when observed at a distance of from about 2 to about 8 feet. However, the disc containing 0.1 weight percent of sodium acetate exhibited the least amount of "yellow" in its flame, while the disc containing 1.0 weight percent of sodium acetate exhibited the greatest amount of "yellow" in its flame. The sample discs containing 0.5 weight percent of sodium acetate exhibited a sufficient amount of "yellow" in their flames to provide notice of ignition. In contrast, the disc of Comparative Example 5 exhibited a faint "blue" flame, which was difficult to see from a distance of from about 2 to about 5 feet.

EXAMPLE 6

A polyacetal composition containing 0 wt % of sodium acetate was prepared by combining the following components:

|   |   |
|---|---|
| a) polyoxymethylene copolymer unstabilized flake | 98.7 wt % |
| b) Acrawax C | 0.2 wt % |
| c) Irganox 259 | 0.5 wt % |
| d) calcium ricinoleate | 0.1 wt % |
| e) polyoxymethylene terpolymer | 0.5 wt % |

The components were briefly tumbled in a barrel followed by high speed mixing for 30 sec in a Henschel mixer to form a mixture. Thereafter, the mixture was extuded into strands in a Werner and Pfleiderer twin screw ZSK extruder, previously heated and purged with polyacetal pellets. The extruder zones were operated at 372° to 387° F., the melt temperature was 415° F. and under a vacuum of 27 in Hg, and the screw speed was 150 rpm. Strands of extrudant were produced at a rate of 38 lbs/hr.

Thereafter, the strands were quenched in cold water and cut into pellets. The pellets were injection mold at conventional pressure, velocity and cycle time settings, a nozzle temperature setting of 360° to 420° F., and barrel temperature setting of 350° to 420 ° F. to form tensile bars.

EXAMPLE 7

A polyacetal composition containing 0.5 weight percent of sodium acetate and other additives, as well as tensile bars therefrom were prepared according to the procedures of Example 6, as follows:

|   |   |
|---|---|
| a) polyoxymethylene copolymer unstabilized flake | 98.2 wt % |
| b) Acrawax C | 0.2 wt % |
| c) Irganox 259 | 0.5 wt % |
| d) calcium ricinoleate | 0.1 wt % |
| e) polyoxymethylene terpolymer | 0.5 wt % |
| f) sodium acetate | 0.5 wt % |

Flame Luminosity Test

Standard tensile bars were been molded from the formulations of Examples 6 and 7, and subjected to the tests for luminosity when ignited under atmospheric conditions. In this test, a fume hood where burning could be safely conducted was equipped with a clamp such that a the tensile bar could be held horizontally in place in front of a 17 inch by 20 inch background of 18% standard gray cards. The tensile bar was ignited at the free edge with a flame, the room was dimmed and luminosity readings were taken with a Gossen, Luna-PRO light meter bearing a 15 degree spot attachment. The light meter was held about two (2) inches from the flame front, and about a dozen successive readings were taken as burning proceeded. A calibration scale on the meter gave the conversion from scale reading to lux (lumen/meter$^2$). The greater the lux value, the greater the amount of luminosity of visible light. The lux values are presented in Table I, below:

TABLE I

| Example | Max. Luminosity, lux |
|---|---|
| 6 | 11 |
| 7 | 175 |

We claim:

1. A polyacetal composition comprising a major amount of polyacetal and from about 0.5 to about 1.0 wt %, based on the total weight of the composition, of sodium acetate to cause the composition to exhibit a luminous flame under combustible conditions.

2. The composition according to claim 1, wherein the polyacetal is selected from the group consisting of:

i) recurring oxymethylene units of the general formula:

; and ii) oxymethylene units comprising about 85 to about 99.9 mole percent oxymethylene repeat units interspersed with repeat units of the formula:

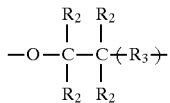

wherein each $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals.

3. A shaped article prepared from the composition according to claim 2.

4. The shaped article of claim 3 which is a knife handle.

5. A polyacetal composition comprising a major amount of polyacetal and about 0.5 weight percent, based on the total weight of the composition, of sodium acetate, wherein the composition exhibits a luminous flame under combustible conditions.

6. The composition according to claim 5, wherein the polyacetal is selected from the group consisting of:

i) recurring oxymethylene units of the general formula:

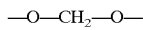

; and ii) oxymethylene units comprising about 85 to about 99.9 mole percent oxymethylene repeat units interspersed with repeat units of the formula:

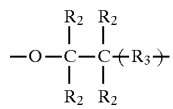

wherein each $R_2$ is selected from the group consisting of hydrogen, lower alkyl radicals and halogen-substituted lower alkyl radicals, said lower alkyl radicals each having from 1 to 2 carbon atoms, each $R_3$ is selected from the group consisting of methylene, oxymethylene, lower alkyl and haloalkyl-substituted methylene, and lower alkyl and haloalkyl-substituted oxymethylene radicals.

7. A shaped article prepared from the composition according to claim 6.

8. The shaped article of claim 7 which is a knife handle.

* * * * *